(12) United States Patent
Armstrong et al.

(10) Patent No.: US 7,166,214 B2
(45) Date of Patent: Jan. 23, 2007

(54) DENTAL AMALGAM SEPARATOR

(75) Inventors: Stephen Armstrong, Halifax (CA); Colin Morrell, Halifax (CA)

(73) Assignee: 3MA Solutions Incorporated, Bedford (CA)

( * ) Notice: Subject to any disclaimer, the term of this patent is extended or adjusted under 35 U.S.C. 154(b) by 56 days.

(21) Appl. No.: 10/952,126

(22) Filed: Sep. 29, 2004

(65) Prior Publication Data

US 2006/0065594 A1  Mar. 30, 2006

(51) Int. Cl.
*C02F 3/00* (2006.01)
(52) U.S. Cl. .................. 210/205; 210/206; 210/208; 210/521; 210/263; 210/265
(58) Field of Classification Search ........ 210/205–208, 210/263, 265, 521–522
See application file for complete search history.

(56) References Cited

U.S. PATENT DOCUMENTS

| | | | |
|---|---|---|---|
| 3,540,589 A | 11/1970 | Boris | |
| 3,862,033 A | 1/1975 | Rozkydalek | |
| 4,058,897 A | 11/1977 | Edwards | |
| 4,710,290 A | 12/1987 | Briltz | |
| 4,732,739 A | 3/1988 | Yamamura | |
| 4,818,391 A | 4/1989 | Love | |
| 4,850,378 A | 7/1989 | Mattiussi | |
| 5,173,195 A * | 12/1992 | Wright et al. ............... 210/802 |
| 5,397,472 A * | 3/1995 | Bouchard ................... 210/519 |
| 5,547,569 A * | 8/1996 | Spencer ..................... 210/206 |
| 5,700,378 A | 12/1997 | Lee et al. | |
| 5,885,076 A | 3/1999 | Ralls et al. | |
| 5,922,204 A | 7/1999 | Hunter et al. | |
| 6,592,754 B1 | 7/2003 | Chilibeck | |
| 6,692,636 B1 | 2/2004 | Chilibeck | |
| 6,763,952 B1 * | 7/2004 | Hanks ........................ 210/521 |
| 2001/0047956 A1 | 12/2001 | Albiston et al. | |
| 2003/0062306 A1 | 4/2003 | Perriello | |
| 2003/0062321 A1 | 4/2003 | Kitayama et al. | |
| 2004/0045882 A1 | 3/2004 | Chillibeck | |

FOREIGN PATENT DOCUMENTS

| | | |
|---|---|---|
| CA | 2354388 A1 | 2/0000 |
| CA | 2107886 A1 | 10/1992 |
| CA | 2464679 A1 | 5/2001 |
| CA | 2421728 A1 | 3/2003 |

(Continued)

OTHER PUBLICATIONS

Canadian Intellectual Property Office, International Search Report (3 pages), mailed Jan. 25, 2006.

(Continued)

*Primary Examiner*—Chester T. Barry
(74) *Attorney, Agent, or Firm*—Baker Botts L.L.P.

(57) ABSTRACT

An apparatus for the removal of mercury and other harmful substances from effluents produced in dentist offices is described. The apparatus involves a series of inclined plates upon which mercury reducing bacteria are present, and a subsequent alkaline pH precipitation chambers and an ion exchange chamber.

18 Claims, 8 Drawing Sheets

FOREIGN PATENT DOCUMENTS

| | | |
|---|---|---|
| DE | 4400612 | 7/1994 |
| JP | 55119498 | 9/1980 |
| JP | 56100698 | 8/1981 |
| JP | 62055092 A2 | 3/1987 |
| JP | 62298753 | 5/1989 |
| JP | 63179489 | 2/1990 |
| JP | 04081700 | 9/1993 |
| WO | WO0006280 | 2/2000 |
| WO | WO0112563 | 7/2000 |

OTHER PUBLICATIONS

L. Trip. "Canada-wide Standards: A Pollution Prevention Program for Dental Amalgam Waste." Journal of the Canadian Dental Association, May 2001, vol. 67, No. 5, pp. 270-274.

P.L. Fan et al. "Laboratory evaluation of amalgam separators." JADA, vol. 133, May 2002, pp. 577-584.

"Amalgam in dental office wastewater. Addressing the Issue." JADA, vol. 133, May 2002, pp. 585-589.

"Dental Equipment—Amalgam separators." International Standard, ISO 11143, First edition, Dec. 1, 1999, pp. 1-23.

R. Hammack et al. "Fate of Oxidized Mercury ib Biologically Regenerated Nox Scrubber Liquor." NETL, University of Pittsburgh.

A. Adegbembo et al. "The Weight of Wastes Generated by Removal of Dental Amalgam Restorations and the Concentration of Mercury in Dental Wastewater." Journal of Canadian Dental Association, Oct. 2002, vol. 69, No. 9, pp. 553-558.

A. Nascimento and E. Chartone-Souza. "Operon mer: Bacterial resistance to mercury amd potential for bioremediation of contaminated envrionments." Genetics and Molecular Research, 2(1):92-101, 2003.

A. Essa et al. "Mechanisms of mercury bioremediation." Biochemical Society Transactions (2002), vol. 30, part 4, pp. 672-674.

H. Von Canstein et al. "Removal of Mercury from Chloralkali Electrolysis Wastewater by a Mercury-Resistant *Pseudomonas putida* Strain." Applied and environmental Microbiology, Dec. 1999, pp. 5279-5284, vol. 65, No. 12.

H. Von Canstein et al. "Spatially Oscillating Activity and Microbial Succession of Mercury-Reducing Biofilms in a Technical-Scale Bioremediation System." Applied and Environmental Microbiology, Apr. 2002, pp. 1938-1946, vol. 68, No. 4.

H. Von Canstein et al. "Species Diversity Improves the Efficiency of Mercury-reducing biofilms under changing Environmental Conditions." Applied and Environmental Microbiology, Jun. 2002, pp. 2829-2837, vol. 68, No. 6.

A. DM Felske et al., "Functional profiling of mercuric reductase (mer A) genes in biofilm communities of a technical scale biocatalyzer." BMC Microbiology 2003, 3:22, Oct. 2003.

Inclined Plate Clarifier. The Ellis Inclined Plate Clarifier is designed to separate solids from water. http://www.elliscorp.com/waste/ipc/ipc.htm, 2001 Ellis Corporation.

\* cited by examiner

DENTAL AMALGAM SEPARATOR

FIELD OF THE INVENTION

The present invention relates to a method and apparatus for the removal of waste products from effluents and in particular the removal of mercury from dental effluents.

BACKGROUND OF THE INVENTION

Dentists have long relied on amalgams for use in restorative dental work. Dental amalgam, more commonly known as a silver filling, is typically a mixture of mercury, and an alloy of silver, tin and copper. Mercury is used to bind the metals together, adds to the durability of the filing and makes up about 45–50 percent of the compounds used as dental amalgam.

Despite concerns over health risks associated with use of mercury and its presence in the environment, dental amalgam continues to be frequently used in dentistry both in North America and worldwide. Dental offices therefore generate a significant amount of mercury waste in the form of dental effluents from working on patients with amalgam filings, or from the application of new amalgam in dental work.

Increasingly, environmental regulations control and limit the disposal of mercury-laden wastes. Dentists are significant producers of mercury wastes and accordingly are turning to amalgam separators in order to comply with the regulations and significantly reduce their output of mercury in dental effluents into the public sewers system. Environmental standards in many cities now demand that 95% or greater of all mercury be removed from effluents before release into the public sewers, and many places are instituting more stringent standards. The International Standards Organization (ISO) 11143 standard Dental Equipment—Amalgam Separators for the removal of mercury by amalgam separators calls for at least a 95% reduction in the effluent level of mercury. While adherence to this standard will result in a significant reduction in mercury emissions from dental offices, these minimum standards are likely to become more stringent over time to better protect the environment. Amalgam separators suitable for use in dental offices should therefore offer a very high level of mercury recovery in order to meet both the present standards and the anticipated future increasingly strict environmental guidelines. Moreover, the space constraints present in many dental offices requires that the equipment and apparatus used for the removal of mercury wastes from dental effluent be of a reasonable size. The apparatus should also not require substantial ongoing maintenance or downtime, and should be able to be operated in a self-sufficient manner for extended periods of time.

Any device for the removal and storage of hazardous waste products from dental effluent in a clinical setting should also avoid the use of dangerous chemicals, and not produce gases or other byproducts that could be harmful upon exposure or release into the environment.

A number of devices have been described that are designed to remove waste products from dental effluents. These devices include one or more aspects such as gravity sedimentation of particles (e.g. US 6,592,752, 5,885,076, 5,795,159, US 200100479561A1, US 5,795,159 and US 4,732,739), centrifuges designed to separate the heavier toxic metallic particles such as mercury from the effluent, ion-exchange systems for binding and removing charged molecules (e.g. 5,885,076), and the use of chemical agents such as precipitants (e.g. 5,885,076, US 200100479561A1), chelating agents, flocculants, or adsorbants (e.g. US 6,592,752, US 6,592,754, US 200100479561A1). Acid-base adjustment, for example in mix tanks, has also been used in order to adjust the pH conditions to promote mercury precipitation in some systems (JP60197285A2, US 6,592,752). Other sedimentation methods or pump filtration systems rely on mechanical filtration for the removal of mercury and other hazardous materials (e.g. US 6,592,752, 5,885,076, 5,795,159, US 6,592,754, US 5,795,159. Such filters optionally incorporate methods based on ion-exchange, pH adjustment and absorbent columns (U.S. patent application Ser. No. 2001/0047956). There are problems with each of these separators. Some of them have very limited surface area for mercury sedimentation. This means that it is less likely that all the influent mercury will sediment before water is passed to downstream chambers or an extremely slow rate of flow to allow adequate time for the amalgam to precipitate before exiting the system would be required. Some systems attempt to overcome this problem by significantly increasing the size of the separator to increase the surface area available for settling resulting in devices of a size that would not be practical for most dental offices. Other systems attempt to overcome the lack of available settling area by specifying an extremely low flow rate through the system. The low flow rates specified by these systems become a significant problem when a dentist flushes vacuum lines with disinfectant and is restricted to adding disinfectant at the rate specified by the amalgam separator. Other systems that use absorbent substances and resins tend to get clogged due to the heavy demands placed on them to remove mercury as seen with some of the filter based amalgam separators currently in the marketplace. Systems that use a combination of sedimentation and absorbents or filters also tend to clog because of the increased proportion of amalgam removal by these systems caused by the inefficient settling system. In addition, the systems that rely on filtration or chemical adsorption are also susceptible to biofouling resulting in more frequent servicing and associated costs for the dental office. In some instances these systems recommend the use of disinfectants to control the growth of microorganisms in the filter or adsorption medium. This practice is not desirable as many of the disinfectants can solubilize and release the mercury previously trapped by the filter or adsorption medium. Some amalgam separators also require extensive down time to clean. Other separators give off gas and noxious odors such as hydrogen sulphides and organic amines. There remains a need to remove as close to 100% of mercury as possible without the problems of clogging, excessive down-time and gas emissions.

U.S. Pat. No. 6,592,754 teaches the use of chambers for removal of solid particles from the suction effluent by way of a sedimentary deposit tank with a series of baffle chambers connected in series through which the effluent flows in sequence as the chambers fill one by one. In each chamber sediment is deposited for later removal. Chemical injection of precipitants is optionally used to improve sedimentation. Positive air pressure or auxiliary pumps drive the effluent. Modular filters or adsorbants are installed downstream of the deposit tank.

However such a device suffers from a number of flaws stemming from the use of baffles chambers, including potential short-circuiting around the internal baffle system or overloading of one of the baffle chambers leading to the clogging of the system. Moreover, as the surface of the baffles is preferably parallel to the flow of the effluent through the system, such baffles are not efficient for inducing the sedimentation of waste materials. This inefficiency can be seen in the recommended flow rate of the device of 20 mL/min. At this flow, the rate at which a dental office could disinfect a line would be reduced to a steady trickle of drops.

Fan et al. evaluated the amalgam removal efficiency of 12 separators according to ISO standards (Fan et al. Laboratory evaluation of amalgam separators. *Journal of the American Dental Association*, Vol. 133 May 2002. p. 577.). Although they reported that all 12 devices removed greater than 95% of amalgam and therefore met the ISO guidelines, the range was from 96.09% to 99.99% efficiency such that the use of some amalgam separators may not assure compliance with the 0.01 mg/L limit for mercury in sewer effluent as found in various city bylaws such as Toronto Municipal Code c. 681. Similarly, Adegbembo et al. evaluated the performance of an ISO certified amalgam separator but found that only 99.4% of mercury waste was removed from the dental effluent such that the concentration of mercury in the effluent was only reduced to 0.1800 mg/L from 31.2973 mg/L (Adegbembo et al. The weight of wastes generated by removal of dental amalgam restorations and the concentration of mercury in dental wastewater. J. Can. Dent. Assoc. 2002 October; 68(9):553–8.).

There remains a need for an apparatus that allows for a very high level of mercury removal (greater than 99.99% recovery) in a system that is both convenient and suitable for use in dental offices.

SUMMARY OF THE INVENTION

The invention includes an apparatus for the safe, efficient and highly stringent removal of toxic substances from dental effluents. In a preferred embodiment of the invention, the toxic substances include mercury from dental amalgams, and other metals used in dental filings such as silver, gold, enamel, porcelain, as well as other substances used in dental work and found in dental effluents.

The structural design of the separator includes separate chambers that mitigate the release of mercury into the environment. In one embodiment of the invention, these chambers include but are not limited to: a surge tank and air/water separator chamber to accommodate the variable water flows and vacuum pressures of the suction lines; a precipitation chamber that combines the use of inclined plates for inducing precipitation with biocatalytic technology; an optional chemical modification chamber that scavenges any residual charged or methylated forms of mercury as well as destroys any pathogens; and an optional ion exchange and/or physical adsorption chamber to act as a third level of purification to ensure the removal of any remaining forms of mercury, pathogens and other waste substances.

The separator is useful in dental offices to mitigate the release of mercury into the sewer system and to cope with a potentially high volume of effluent and mercury waste without requiring frequent maintenance, replacement of component parts or extensive downtime. The separator also mitigates the release of potential pathogens as well as noxious fumes into the sewer system or dental office.

The invention exceeds national and international sewer discharge guidelines for release of mercury from dental offices. Although the ISO standard minimum requirement is 95% removal of mercury waste from dental streams, the separator of the invention removes at least 99.99% of mercury from water. The invention as described would therefore exceed even the more stringent standard of 0.01 mg/L.

The present invention provides a separator designed to meet the changing pressure, temperature, chemistry and flows of water and/or air such that the bulk flow of mercury through the system is eliminated and prevents the clogging possible in other dental amalgam separators currently used in the marketplace.

In one embodiment of the invention, the system is portable and optionally changed within the dental office in an efficient and timely manner. The separator may be cleaned as often as necessary and, for example, could be operated for about one year between cleanings. During the refurbishing process, the amalgam separator is readily opened to remove the mercury amalgam waste material and resin at an accredited waste handling facility. The various components are optionally immersed in 2% sodium hypochlorite to clean and disinfect the apparatus for approximately 1 hour. The waste water containing soluble mercury is decanted and the amalgam separator rinsed with distilled water. The components of the separator are then re-assembled as necessary. The combined waters are then treated by standard waste water treatment technologies. The current invention is self-contained and self-sufficient, and does not use noxious or dangerous chemicals, or emit noxious gasses or odours.

Providing a biofilm of mercuric reducing bacteria on the precipitation plates enhances the ability of the separator to trap various mercury species. The soluble forms of mercury are converted into insoluble forms by the enzyme mercuric reductase produced by bacteria located within the biofilm. The invention also provides biofilms of bacteria specifically developed for use on the precipitation plates.

The combination of the use of angled precipitation plates and the catalytic biofilm enables the simplified design of the separator while increasing the efficiency of the device for the removal of mercury and other waste products.

In one embodiment, the invention relates to a method of separating mercury from water, comprising:

a) collecting water to be treated, b) feeding water to be treated to a plate chamber, the chamber containing a plurality of plates inclined to the horizontal and contacting the water with the plurality of plates to separate mercury from water feeding the water to the plates in parallel, the separation occurring by one or more mechanisms comprising i) sedimenting mercury, ii) enzymatically precipitating mercury and iii) filtering mercury, to produce a plate chamber effluent. The separation may also occur by two of these mechanisms or all three of these mechanisms. The plates optionally simultaneously begin sedimentation of mercury during filling of the container with water.

The method optionally further comprises conducting the capture effluent to a chemical addition chamber and separating mercury from the plate chamber effluent by reacting mercury with a precipitation agent to form precipitated mercury that sediments in the chemical addition chamber to produce a chemical addition chamber effluent. The method may further comprise conducting the chemical addition chamber effluent to a resin bed chamber and separating mercury from the chemical addition chamber effluent by contacting the mercury with a resin for one or more mechanisms comprising ionically binding the mercury and filtering the mercury, to produce a resin effluent.

In a variation, the method optionally further comprises conducting the plate chamber effluent to a resin bed chamber and separating mercury from the capture effluent by contacting the mercury with a resin for one or more mechanisms comprising ionically binding the mercury and filtering the mercury, to produce a resin effluent.

In one embodiment, each plate i) sediments mercury and ii) supports a biofilm of mercury reducing bacteria for enzymatically precipitating mercury, the bacteria producing glycocalyx for filtering mercury. The bacteria optionally comprise mercuric reductase for enzymatically precipitating mercury.

The precipitated mercury is optionally obtained by increasing pH of the capture effluent by contacting an alkaline solution comprising a compound, such as carbonate, with the capture effluent. Other compounds for increasing pH or otherwise reacting to produce solid mercury are also useful.

The resin comprises optionally comprises an ion exchange resin, such as a cation exchanger comprising a sulfonic acid active group. The resin may alternatively comprise biological resin, composed of a filter, such as a biological filter medium of sufficient surface area to support the growth of mercury reducing bacteria similar to the bacteria composing the biofilm on the inclined plates. The resin bed chamber optionally comprises an adsorption substance for adsorbing mercury, for example, sand and/or charcoal.

The resin bed chamber optionally comprises an adsorption substance for adsorbing mercury, and the resin and the adsorption substance are optionally layered, wherein the resin layer is received between a first adsorption layer and a second adsorption layer.

The invention also includes a separator for removing mercury from water, comprising:
  a plate chamber comprising a plurality of plates received in the chamber and inclined to the horizontal,
  distribution structure (such as distribution means) for distributing uniformly the flow of the water over the surfaces in parallel.

The flow distribution means obtains even flow adjacent to the bottom edges of the plates. This provides an even upward flow through the plate array. The flow is preferably a turbulence-free upward flow. The plates are optionally arranged in a first array and a second array, the first and second arrays defining a gap therebetween. The invention is also useful with more than two arrays or a single array (for example a single array defining a gap between the array and the side of the container). The inclined surfaces are optionally configured to produce Brownian-like still conditions in the water to separate mercury from water by sedimentation of mercury while preventing channeling of water through the separator. The method optionally comprises contacting mercury with the inclined surfaces to prevent turbulent conditions from forming during the flow of water through the separator to separate mercury from water by sedimenting mercury while preventing separation inefficiencies through short circuiting of water through the separator by bypassing portions of the surface area of the plates.

The separator optionally comprises a surge chamber for collecting water. The surge chamber optionally comprises a surge inlet for receiving water to be treated and a surge outlet, for example, located above the plate chamber and aligned over the gap between the plates for conveying water to the plate chamber through the gap. Other configurations for the surge chamber are also useful and readily apparent. The surge outlet optionally comprises an elongate aperture for conveying water to the plate chamber along substantially the entire length of the gap (the gap may be continuous or it may be broken up into smaller portions). The gap may be any useful shape. The plates optionally comprise substantially the same length, width, surface area and angle of inclination. The plates are optionally parallel to one another. The plates are also optionally relatively closely spaced in proportion to their width and inclined height to obtain a large surface area within the volume of the plate chamber. Optionally, each array includes at least 10 plates or at least 15 plates. The plates are optionally inclined between 45–60 degrees to the horizontal, such as 59 degrees. The plates are optionally perpendicular to the direction of water flow from the inlet to the upper edge. In one embodiment, each plate comprises an upper surface and a backing surface opposed to the upper surface, wherein each upper surface and the backing surface of an adjacent plate define a channel therebetween. The upper surface of each plate is typically more effective in precipitation because of gravity, which provides enhanced sedimentation, however, both surfaces assist sedimentation and optionally are covered with mercuric reducing bacteria biofilm. The separator optionally comprises plates useful for at least one, two or all three of i) sedimenting mercury, ii) enzymatically precipitating mercury and iii) filtering mercury.

In the separator, the plates are optionally configured for sedimenting mercury and the plates further comprise a biofilm of mercuric reducing bacteria for enzymatically precipitating mercury, the bacteria producing glycocalyx for filtering mercury.

The separator optionally further comprises:
  a) a chemical addition chamber downstream of the plate chamber, the chemical addition chamber comprising chemical addition structure (such as chemical addition means) for adding a chemical to water to precipitate mercury;
  b) a resin bed chamber downstream of the plate chamber and/or the chemical addition chamber the resin bed chamber arranged so water flows through the resin bed, the resin bed comprising resin for ionically binding the mercury and filtering the mercury.

The plate chamber optionally defines and upper edge and the chemical addition chamber is optionally connected to the plate chamber along the upper edge so that water overflowing from the container enters the chemical addition chamber. The water is optionally contained in the chemical addition chamber by a weir (upwardly depending flange) such that water flows over the weir or flange into the resin bed chamber. The resin bed chamber optionally comprises a resin and an adsorption substance for adsorbing mercury. The resin and adsorption agent are optionally in alternating layers, for example, with resin layer received between a first adsorption layer and a second adsorption layer. The ratio of first adsorption layer:resin layer:second adsorption layer optionally comprises a ratio selected from the group of about: ratios of 1:1:1; 1:2:1; 1:3:1; 1:4:1 or 1:5:1. The adsorption agent optionally also includes mercuric reducing bacteria. The separator optionally further comprises structure (such as a means) for creating a negative pressure to force water through the separator. The negative pressure is optionally provided by structure (such as a means) for constricting a chamber outlet.

The invention also includes a kit for a separator for removing mercury from water, comprising:
  a plate chamber;
  a plurality of inclined plates configured to be received in the plate chamber and inclined to the horizontal;

directions for growing a biofilm of mercury reducing bacteria on the inclined surfaces. Other separator components described in this application are also optionally included in the kit.

The invention also optionally includes a composition comprising:
- 35–55% inorganic carbonate compound;
- 35–55% inorganic phosphate compound; and
- 1–5% inorganic hydroxyl/oxide compound.

The composition optionally further comprises up to 1% titanium and/or zinc. The composition optionally further comprises up to 1% inorganic or organic sulphur compound. The composition is optionally formed into a solid or semi-solid biscuit. The biscuit is optionally formed into a shape complimentary to a pH chamber retaining surface so that the biscuit is received in the retaining surface.

Therefore, the invention also includes the use of a separator of the invention for removing mercury from wastewater. The invention also includes a method of removing mercury from wastewater comprising contacting the wastewater with a separator of the invention to remove mercury.

The above apparatus is used in dental offices, dentistry clinics, or schools or universities engaged in the teaching or practice of dentistry.

Other features and advantages of the present invention will become apparent from the following detailed description. It should be understood, however, that the detailed description and the specific examples while indicating optional embodiments of the invention are given by way of illustration only, since various changes and modifications within the spirit and scope of the invention will become apparent to those skilled in the art from this detailed description.

BRIEF DESCRIPTION OF THE DRAWINGS

Certain embodiments of invention will be described in relation to the drawings and figures.

DETAILED DESCRIPTION OF THE INVENTION

Figure 1:
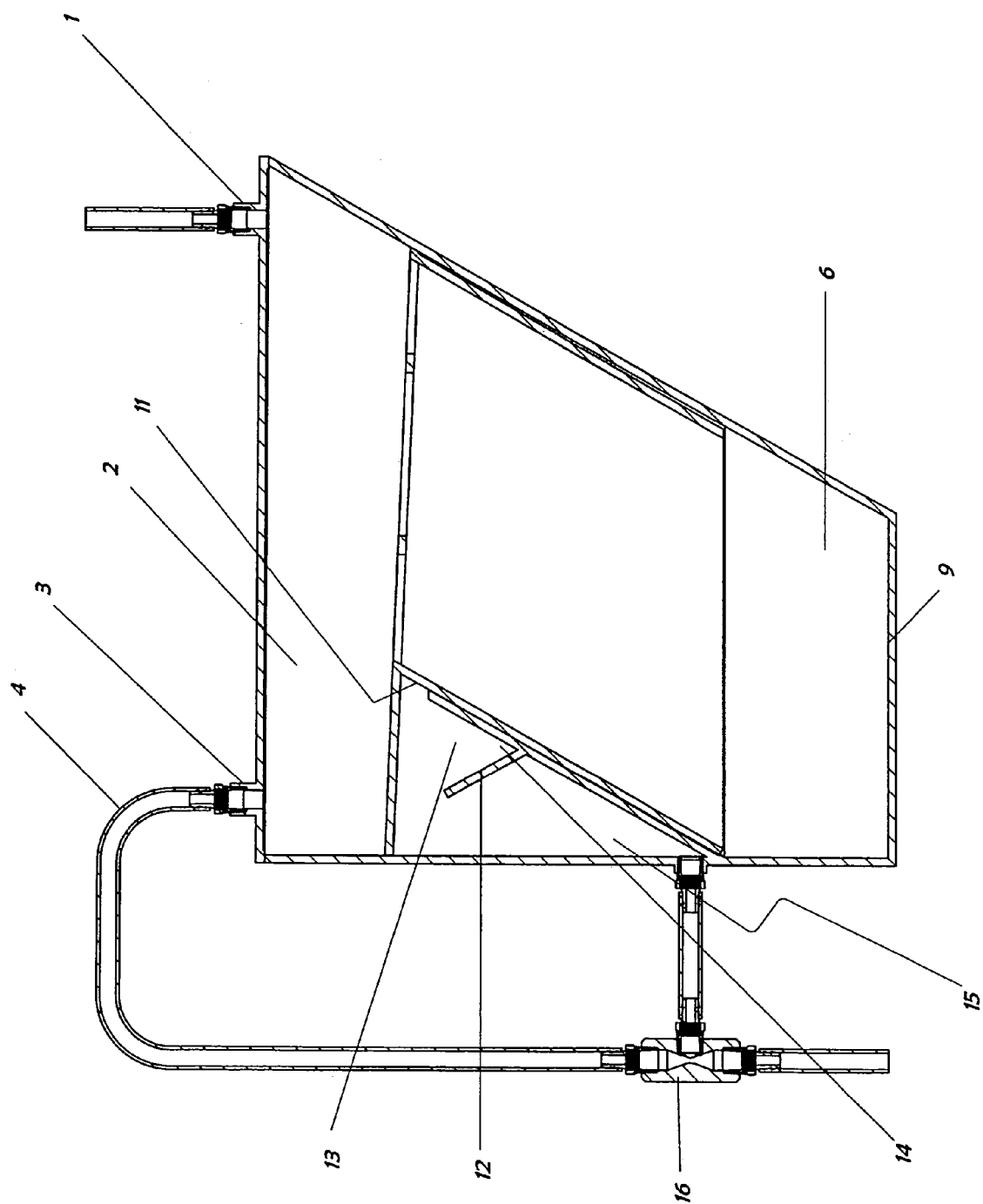
FIG. 1 shows a cross-section through the middle of the separator.

The inventors have developed a separator for the highly efficient removal of mercury and other toxic particles from waste-water effluent. In a preferred embodiment, the separator may be used for the removal of mercury waste derived from dental amalgam as well as other substances found in the waste effluent from dental work.

The separator for removing mercury from water optionally includes:
- a plate chamber comprising a plurality of plates received in the chamber and inclined to the horizontal, and
- distribution structure (such as a distribution means) for distributing uniformly the flow of the water over the plates in parallel.

The distribution means provides even flow adjacent to the bottom edges of the plates. This provides an even upward flow through the plates, which are optionally configured in an array, such as one or more arrays of parallel plate arrays. The flow is typically a turbulence-free or low-turbulence upward flow. The plates are optionally arranged in a first array and a second array (such as each array including a row of parallel plates), with the arrays defining a gap between them. Each plate typically comprises an upper surface and a backing surface opposed to the upper surface, such that each upper surface and the backing surface of an adjacent plate define a channel therebetween to allow water to flow upwardly through the channel.

In one embodiment, each plate i) sediments mercury and ii) supports a biofilm of mercury reducing bacteria for enzymatically precipitating mercury. The bacteria typically comprise mercuric reductase enzyme for enzymatically precipitating mercury. The bacteria also produce a matrix of glycocalyx for filtering mercury.

The separator optionally further comprises:
a) a chemical addition chamber downstream of the plate chamber, the chemical addition chamber comprising chemical addition means for adding a chemical to the water to precipitate mercury;
b) a resin bed chamber downstream of the plate chamber and/or the chemical addition chamber. The resin bed chamber is typically arranged so water flows through the resin bed and the resin bed includes resin for ionically binding the mercury and filtering the mercury. This bed optionally also includes an adsorption agent.

In another embodiment, the invention relates to a method of separating mercury from water, by:
a) collecting water to be treated,
b) feeding water to be treated to a plate chamber. The plate chamber contains a plurality of plates inclined to the horizontal. Water is contacted with the plurality of plates to separate mercury from water. Water is preferably fed to the plates in parallel. The separation optionally occurs by one or more mechanisms such as i) sedimenting mercury, ii) enzymatically precipitating mercury and iii) filtering mercury, to produce a plate chamber effluent.

The plate chamber effluent is optionally conveyed to a chemical addition chamber where mercury is reacted with a precipitation agent to form precipitated mercury. In one embodiment, the precipitation agent is a compound that increases the pH causing mercury precipitation. The precipitated mercury then sediments in the chemical addition chamber to produce a chemical addition chamber effluent. Optionally, this effluent is conducted to a resin bed chamber where mercury is further separated from water by contacting the mercury with a resin for one or more mechanisms such as ionically binding the mercury and filtering the mercury, to produce a resin effluent. An adsorption agent is optionally used, for example by intermixing it with the resin or layering it with a resin layer, to further remove mercury. The order of the chemical addition chamber treatment and the resin bed chamber treatment may be reversed with respect to the plate chamber The invention also includes a kit for a separator for removing mercury from water, comprising:
 a plate chamber;
 a plurality of inclined plates configured to be received in the plate chamber and inclined to the horizontal;
 directions for growing a biofilm of mercury reducing bacteria on the inclined surfaces. One or more other separator components described in this application are also optionally included in the kit.

An embodiment of the separator optionally contains the following components described below.

Referring to FIG. 1, waste containing effluent from a dental vacuum line enters the separator (S) at an inlet (1). This inlet is connected to a surge tank (2), which allows for the separation of the air stream and the waste-water stream. The surge tank also helps dissipate the kinetic energy of the incoming effluent stream, in order to promote consistent flow conditions within the separator. Attached to the surge tank is an air bypass outlet (3) and air bypass tube (4) that is positioned away from the inlet (1) on the surge tank and curved in order to prevent the entry of water effluent into the air bypass. The surge tank is specifically designed to meet the variable water flow and pressures of the vacuum lines found in dental offices and separate the air and water streams of the dental vacuum effluent. Moreover, the air bypass tube (4) is of sufficient size to allow the efficient separation of air from the water stream and to alleviate any pressure changes such as pulses, vacuum conditions and pressure buildup.

Figure 3:
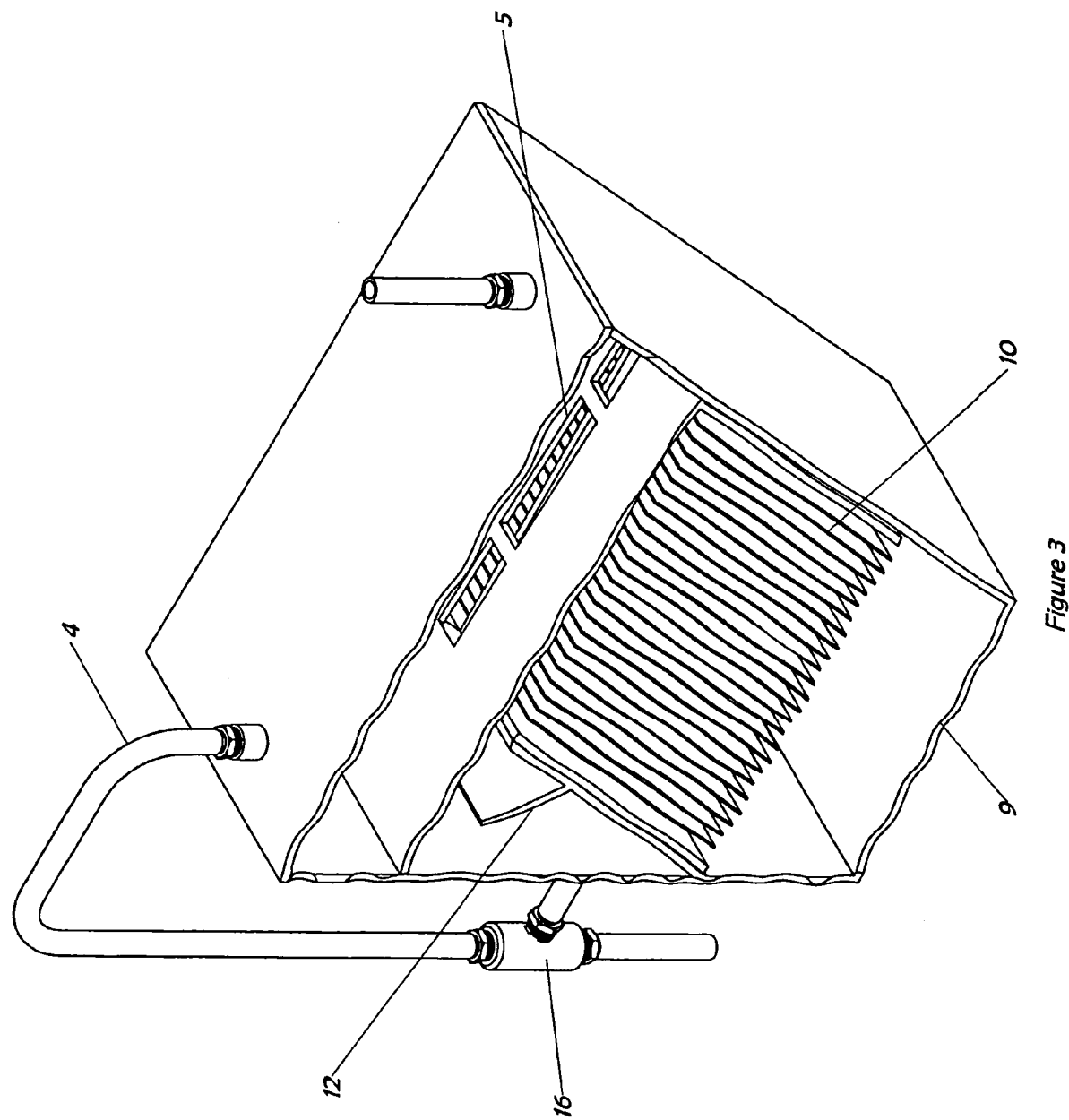
FIG. 3 shows an additional elevated cross section of the separator, showing the arrangement of the inclined plates with respect to the center channel.
Figure 4:
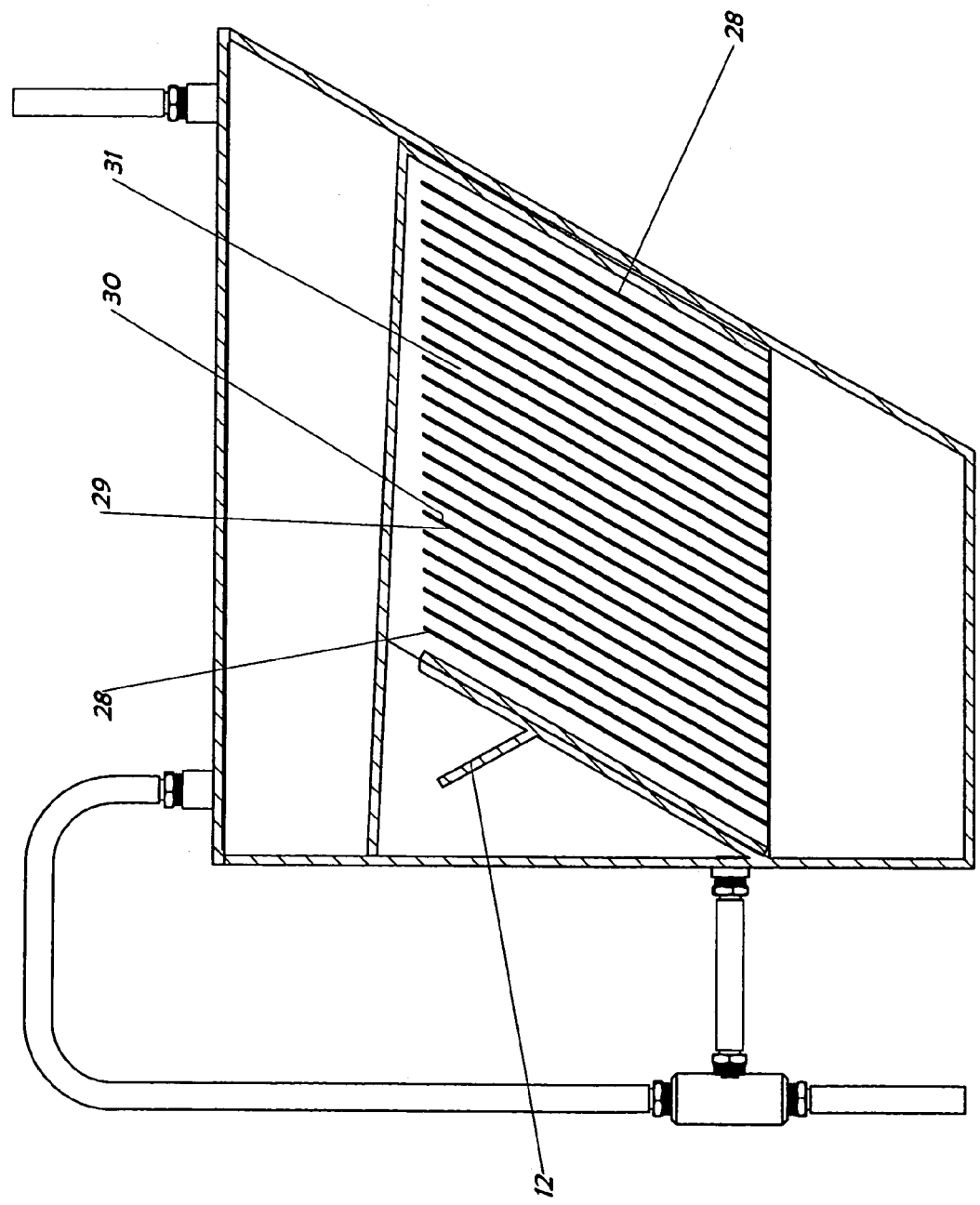
FIG. 4 shows a cross section through the separator.

A distribution means distributes uniformly the flow of the water over the plates in parallel. In one embodiment, the distribution means comprises a surge tank surface defining a connection aperture (5) (FIG. 3), which allows for the even flow of effluent to the base of the plate chamber (6) to facilitate flow of water upwardly over the plates in parallel. The surge tank may be located on top of the plate chamber or otherwise located to deliver water through the connection channel to the plate chamber (6). The connection channel is designed to deliver water in a manner that contributes to laminar flow conditions in the plate chamber and cause even spread of amalgam laden water into the plate chamber. This is useful so that all the plates are utilized in a parallel as opposed to a series nature. The connection channel is optionally centrally located (i.e. a central connection channel) and also optionally has an elongate shape that helps deliver water flow evenly to the plates. It is not necessary that the connection channel be in a central location as long as the connection channel is located in a position that allows even flow of effluent to the plate chamber. The connection channel may be horizontal or inclined. The channel may be a continuous, elongate aperture. Alternatively, the channel may be replaced by a series of apertures, such as a series of smaller gaps or holes.

Figure 5:
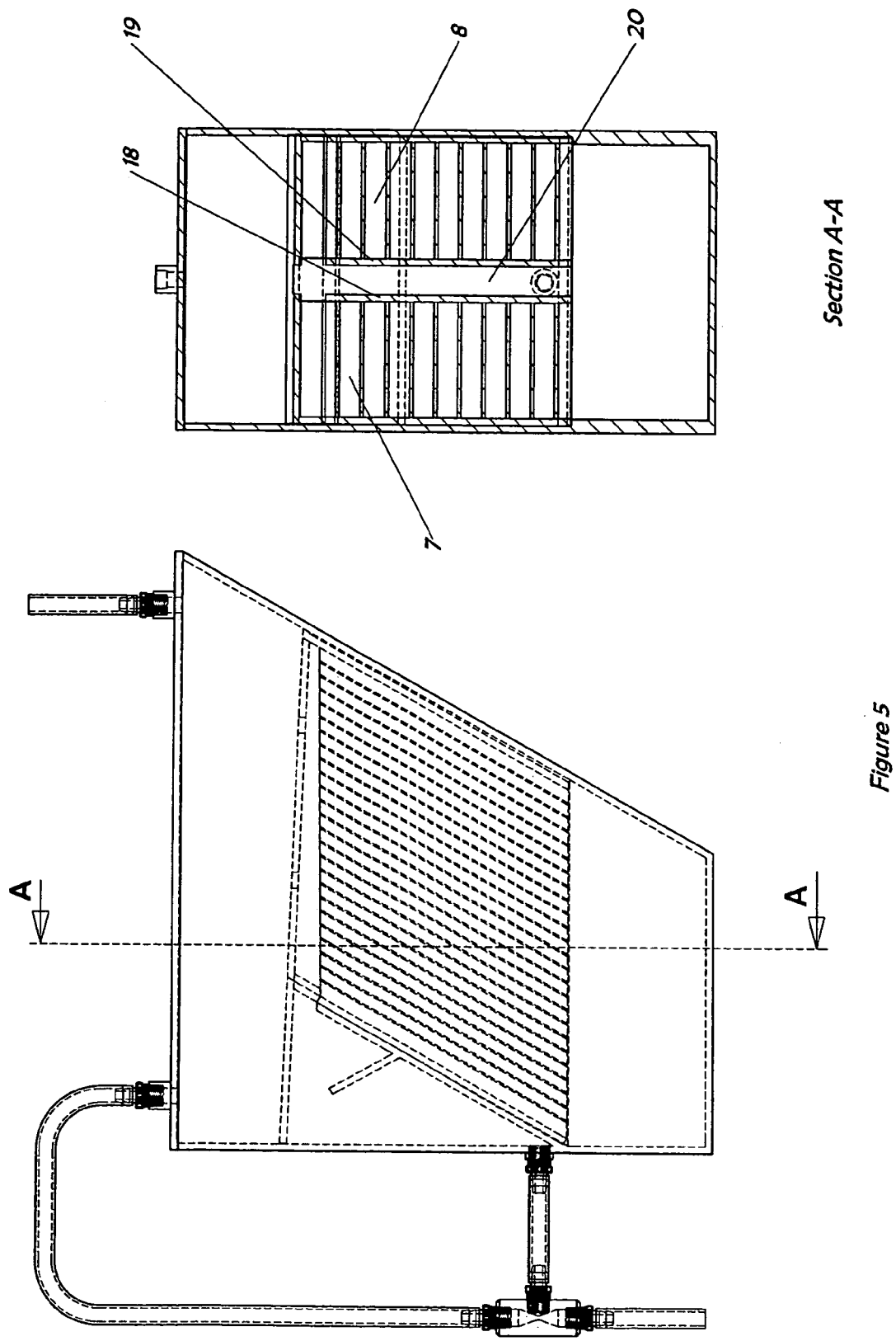
FIG. 5 shows two cross sections of the separator highlighting the two banks of precipitation plates separated by the center channel.

The plate chamber optionally consists of two arrays of parallel inclined plates (7) and (8) (FIG. 5) located above, and preferably not contacting, the plate chamber base (9). The two arrays of plates define a gap (10) therebetween (a portion of a housing may be located in the gap and define a gap in certain embodiments, as described below). FIG. 5 shows a cutaway view of the separator along line A—A which illustrates the alignment of the arrays of plates (7,8) in the separator. The base (9) of the plate chamber also serves as a stage for the storage and collection of sediment. Water typically travels through the connection aperture and through an interior gap defined by the sides of the plates (10). There is a void between the bottom edge of the inclined plates and the base of the plate chamber (9), in order to prevent clogging and allow for the even flow of effluent throughout the plate chamber and up each of the inclined plates. The inclined plates are arranged at an angle to the horizontal.

As the solution flows down the central connection channel and into the precipitation plate chamber, heavier waste particles will deposit along the bottom of the chamber. The water then flows up from the bottom of the plate chamber past the series of inclined plates where a graduation of smaller particles will be captured and/or precipitated by the inclined plates with lighter particles typically being captured higher up on the plates. Water moves in the separator and contacts the inclined plates in a manner that prevents turbulent conditions from forming during the flow of water through the separator. The separator therefore separates mercury from water by sedimenting mercury while preventing separation inefficiencies through short circuiting of water through the separator that can occur if water bypasses portions of the surface area of the plates. The parameter that governs the transition from laminar to turbulent flow is the Reynolds number. (Fundamentals of Fluid Mechanics, $2^{nd}$ edition by Bruce R. Munson, Donald F. Young and Theodore H. Okiishi, John Wiley and Sons copyright 1990 and 1994). The Reynolds number is defined as $Re=\rho Vl/\mu$, where $\rho$ is the fluid density, V is velocity, l is a characteristic length and $\mu$ is viscosity. The transition from laminar to turbulent flow is a complex function, but is preferably taken as 500,000 for in this application, where the length term in the Reynolds number is the distance measured from the leading edge of the inclined plate.

It will be readily apparent to a skilled person that there are alternative ways to flow water through the separator of the invention to prevent turbulent conditions from forming. For example, one may optionally vary the location, shape, angle or size of the connection channel or the connection aperture to deliver fluid to a plate array from alternative locations on the separator or from alternative flow angles while still providing provide even, non-turbulent flow to the separator (preferably delivering water adjacent to the bottom edges of the plates). One may also use a separator comprising multiple channels or apertures and varied configurations of plates and plate arrays.

In an optional embodiment, the inclined plates are covered in a biofilm containing mercury reducing bacteria that precipitate mercury. The bacteria provide many advantages. First of all, since the bacteria reproduce, it provides a self-renewing system. The bacteria also take part of the mercury load off of the downstream resins and filters. In a further embodiment, the invention contemplates the presence of a glycocalyx produced by the biofilm acting to further trap mercury and other waste components in the plate chamber through physical filtering and binding due to ionic charges in the glycocalyx and trapped components. The solution then flows out of the chamber through an exit port (11), into a chemical addition chamber (13). In one embodiment, the water flows onto a weir (12), defining the chemical addition chamber (13) where any residual forms of soluble mercury are further precipitated by physical and chemical processes. The mercury precipitation is caused by a means for adding a chemical to the water for precipitating mercury, such as adding a pH increasing agent capable of raising pH to precipitate mercury or any other useful compound that reacts with mercury to form solid mercury. Optionally positioned within the weir is a chemical reservoir (14) and, optionally, a specially formulated chemical biscuit, which serves to moderate the pH of the chamber by slow dissolution of the biscuit to ensure alkaline conditions in order to precipitate any remaining soluble mercury. Alkaline liquid may be added instead of using a chemical biscuit, for example, by manual addition of liquid or addition by fluid communication between the chemical addition chamber and a reservoir containing the alkaline liquid through a port). The alkaline chemical environment of the chemical modification chamber due to the chemical biscuit also serves to destroy pathogens contained in the dental effluent. The biscuit or alkaline liquid may also contain chemicals other than pH adjusters to induce the precipitation of mercury from the solution. The mercury precipitated through the action of the chemical biscuit on the solution sediments to the bottom of the weir, while the solution flows over the weir into a resin bed chamber, such as a resin filtration adsorption chamber (15). The resin filtration adsorption chamber optionally contains a series of ion exchange and physical absorption media. These act to bind any remaining particles, pathogens or mercury ensuring the purity of the solution flowing out of the separator. In one embodiment the ion exchange resin is oriented between or within a coarse material (i.e. sand, hydrophobic resin) at various ratios to optimize for the hydrophobic and charged binding of residual mercury species to the resin. In another embodiment of the invention, a cationic exchange resin binds soluble mercury and physically filters the solution. In a further embodiment the solution passes through a layer of activated charcoal, additionally purifying the effluent. The invention also contemplates a biofilm consisting of mercury reducing bacteria formed on the activated charcoal layer or resin to further precipitate any soluble mercury. The composition of the layers in the resin filtration chamber is optionally modified in accordance with the needs of a particular dental office or effluent stream. It is possible for a biofilm to form on the tertiary ion-exchange resin.

The ion-exchange resin is optionally active over the entire pH range (0–14), however in an embodiment of the invention, the pH of the water flowing through the ion-exchange resin is around pH 8.5. The ion exchange resin does not typically receive significant amounts of soluble or insoluble mercury because of the high efficiencies of the precipitation plates and chemical biscuit technology in removing most of the mercury. In one embodiment of the invention, the use of sand within the resin system is for weighting and bulking since it is anticipated that the mixture will be placed in a mesh bag.

The solution flows through the resin filtration layers to the bottom of the resin filtration chamber where there is optionally a constricted outlet so as to produce a negative pressure to assist in actively pulling the solution through the filters in the resin filtration chamber. The treated water then rejoins the air stream from the air bypass at connector (16) and can safely be released into the public sewer system. In flow experiments using 5 L/minute for 30 minutes, there was no short circuiting of water. In one variation of the separator, a physical storage reservoir is located before removal of mercury free water to the exterior of the separator where it meets the air bypass structure. This provides a reservoir to store water, if necessary, before it passes to the air bypass structure.

Figure 2:
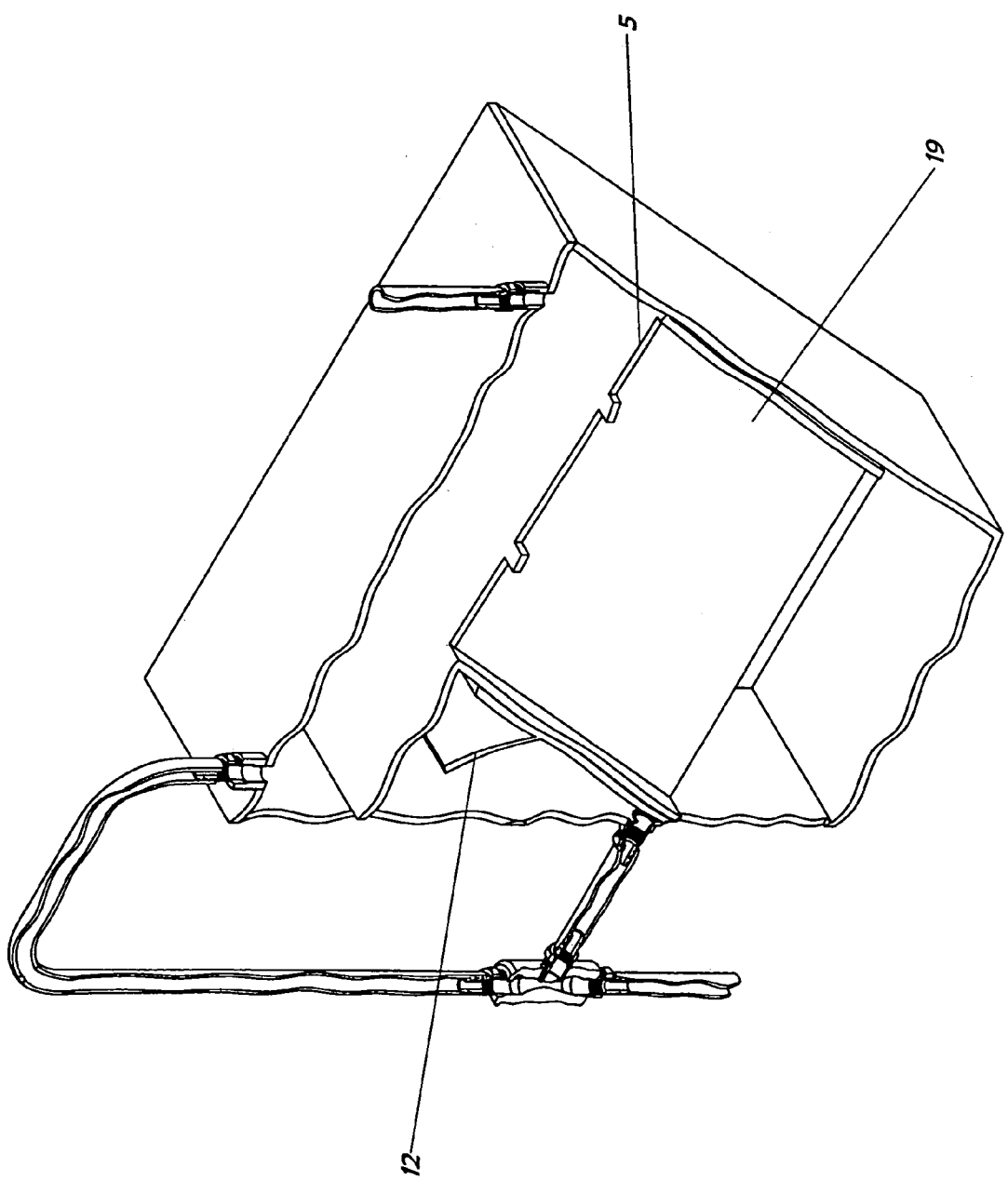
FIG. 2 shows an elevated view of the cross-section of the separator as seen in FIG. 1.
Figure 6:
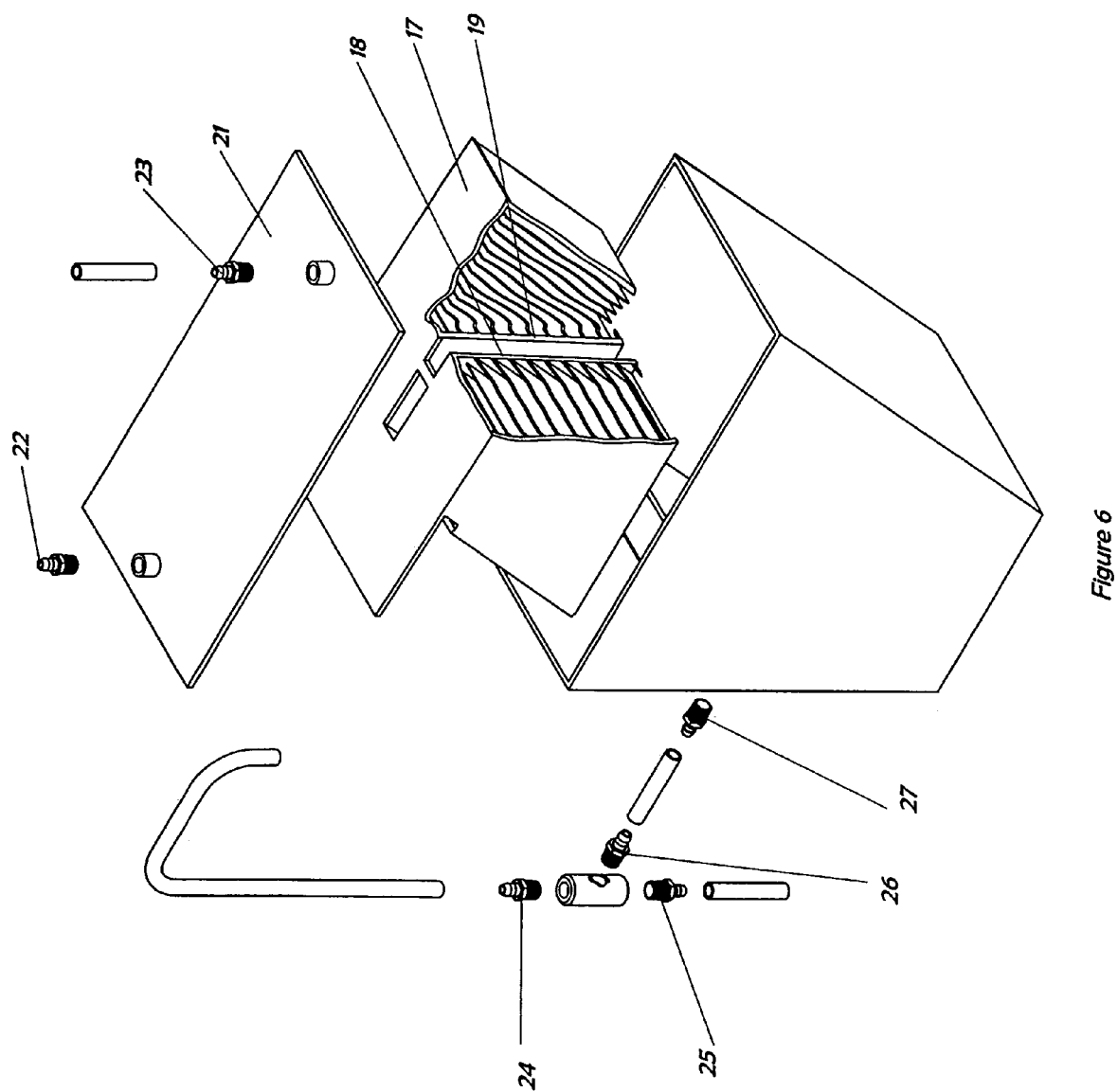
FIG. 6 is an exploded view of the individual components of the separator with a portion of the inclined plate assembly cut away exposing the center channel and the two banks of inclined plates.
Figure 7:
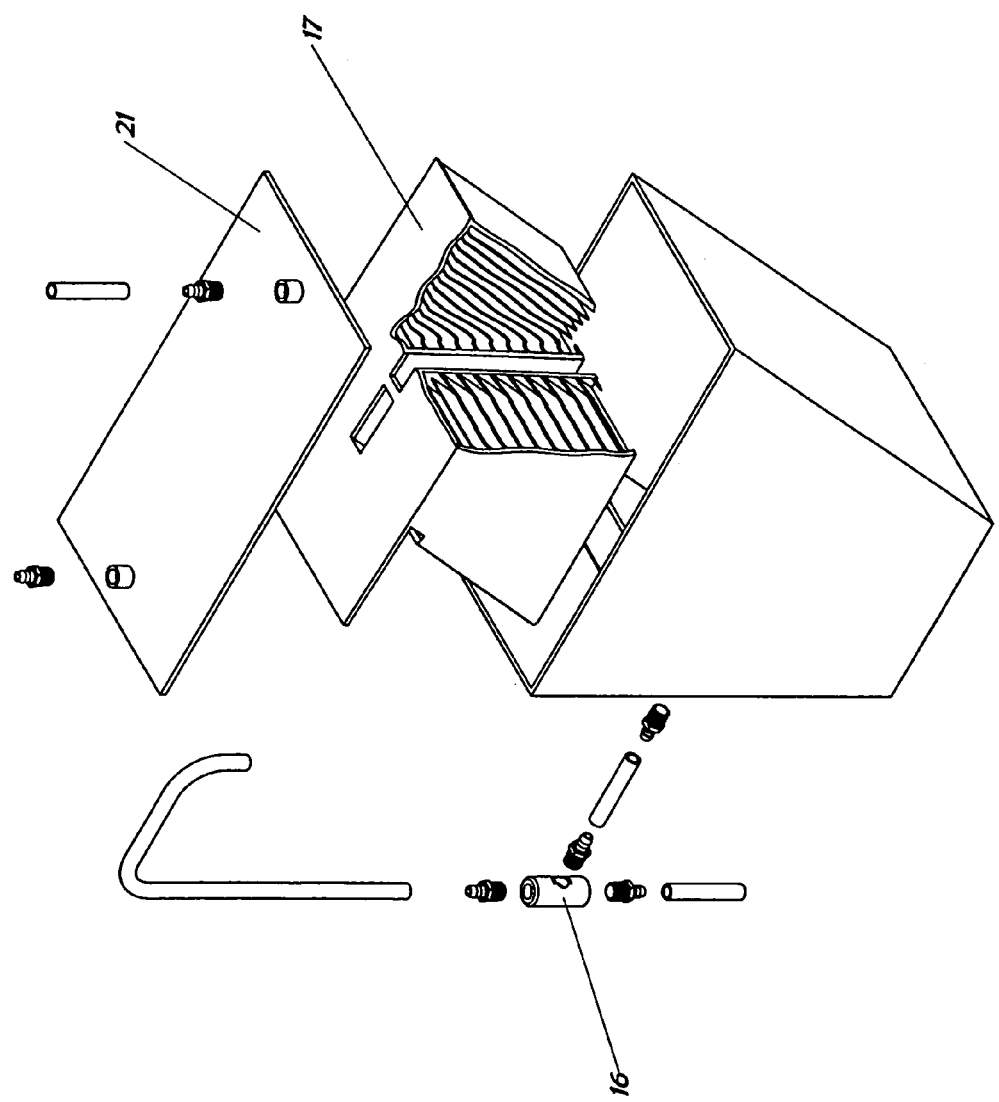
FIG. 7 is an exploded view of the individual components of the separator.
Figure 8:
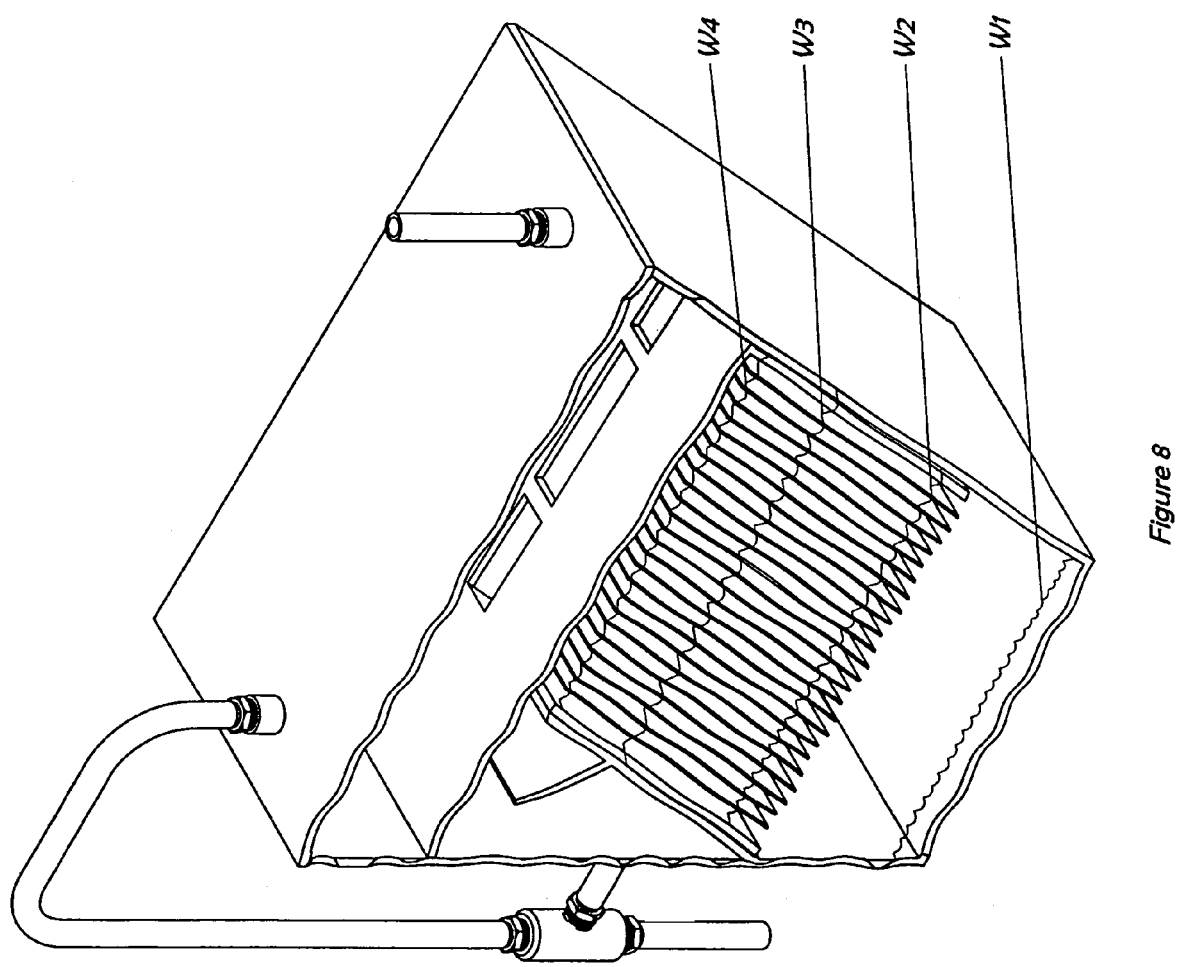
FIG. 8 shows the separator before the water level contacts the plates (W1); as the water level starts to contact the plate (W2) so that less 10% of each plate surface contacts water; when the water level contacts over 50% of each plate surface (W3); and when the water level contacts approximately 100% of each plate surface (W3).

Referring to FIGS. 6 and 7, the plates are optionally surrounded by a housing (17), which also optionally encloses the plates, such that the housing has opposed sides (18, 19) that optionally define a gap (20) between the rows of plates (FIGS. 2 and 5). Water flows through the connection aperture (5) and the gap providing for an even flow of effluent to the base of the plate chamber (FIG. 8). The housing (17) show in FIG. 6 blocks wastewater from contacting the plates prior to delivery of water to the base of the plate chamber. The separator optionally includes a removable lid (21) which allows access to the separator interior, for example, to clean the device or add chemicals, such as a carbonate biscuit. The lid also optionally defines the upper surface of the surge tank. Fluid conduits are releasably fastened to the separator with conventional fasteners (22, 23). Conventional fasteners (24–27) are also optionally used to connect fluid conduits to other parts of the separator or other conduits or connectors.

Each plate (28) in the plate array (7, 8) has an upper surface (29) and an opposed lower surface (30). Each upper surface and the adjacent lower surface of a neighbouring plate define a channel (31) therebetween.

The separator can be increased or decreased in size in order to accommodate the needs of various practices or dental school clinics. They may also be arranged in a parallel nature.

The invention as described may be in any one of a number of forms. A preferred embodiment is a box-type design as described, which is very compatible with operation of the precipitation plates, volume of collection chamber and the positioning of the chemical and ion-exchange chambers. Another embodiment of the invention is a cylindrical shaped design optionally accommodating the same chambers optionally in the same order as the box-shaped device. The orientation of the various chambers, most notably the chemical and ion-exchange resin, is variable, for example by positioning distal or dorsal to the precipitation plates. The dorsal orientation of the chambers is useful in a cylindrical designed separator, for example, by configuring the ion exchange resin on top of the precipitation plates, and inserting a chemical precipitation chamber in the storage chamber.

The invention as described is optionally modular in nature, and the components of the separator may be used individually or in combination with each other to effect the separation of mercury as required by the particular conditions of a dental office. As well, a separator may be connected with other separators to improve wastewater purification capacity.

Inclined Plates in the Plate Chamber

An aspect of the invention is the inclined plates within the plate chamber. The angles of the precipitation plates are optionally orientated between 45–60 degrees to the horizontal base of the separation chamber. The active surface area of the plates increases with a decreasing angle of orientation, while the tendency for the precipitation plates to clog decreases with an increasing angle of orientation. In an embodiment of the invention the plates are orientated at 59 degrees. The combined ability of the plates not to clog and also maintain a high active surface area is typically maximized within the angular range of 45 to 60 degrees to the horizontal. The minimum number of plates is optionally based upon the flow rate and the size of the plates. For example, in order to achieve the same level of performance with fewer plates, one would typically reduce the flow of water/amalgam going through the separator. In one embodiment of the invention, the minimum number of plates is 40 with dimensions of 10"×4" to capture 95% of incoming amalgam at a flow rate of 5 liters/minute. Width of the plates is variable. The plates are optionally spaced at a width of 0.5" center to center and can optionally be spaced as much as 1.0" center to center. The tighter spacing is preferable as it gives greater probability of contact between the soluble mercury and the biofilm on the plates. The separator embodiment shown in FIG. 1 has a total of 50 plates of 10.5"×4.25" spaced on 0.5" centers with an angle of 59 degrees.

The sedimentation of solids within an inclined plate separator is dependent on a number of factors such as density and size of the particles themselves. This invention is concerned with the sedimentation of the amalgam which will typically have a specific gravity in the range of 10 to 11 g/cm$^3$. In this case, assuming a constant specific gravity, the size difference of the amalgam particles is an important variable considered by the design of the separator.

The invention therefore achieves an efficient separation of mercury amalgam by considering the cross-sectional area present within a settling basin. A greater area for the settling basin allows for smaller particles to more easily settle out of solution. The design of settling tanks has been described (e.g. Transactions of the American Society of Civil Engineers, Paper No. 2285, Sedimentation and the Design of Settling Tanks, by Thomas R. Camp, pages 895 to 958). This invention however uses plates such that the cross-sectional area can be significantly increased without increasing the overall footprint of the settling device.

Optionally, the projected area of each plate on a horizontal plane represents the effective settling area according to the following equation:

$$At = n(Ap)\cos(x)$$

where;
At=total area
n=number of plates
Ap=area of each plate
x=angle of the plates.

In addition to providing the increased surface area for the precipitation of the amalgam in the solid form, the use of plates in the invention also provides a greatly increased surface area for the biofilm effectively increasing the contact of the biofilm with dissolved species of mercury.

Biofilm

Another useful aspect of the invention is the optional presence of a biofilm containing mercury reducing bacteria on the surface of the inclined plates in the precipitation chamber. This allows for the precipitation of soluble forms of mercury in the effluent through the action of the enzyme mercuric reductase in the bacteria that converts soluble mercury ($Hg^{2+}$) to insoluble mercury ($Hg^0$). A biofilm may be defined as: a colony of bacteria or other microbial cells that grow on a surface to enhance survival. The microbial cells are encased in an adhesive, usually a polysaccharide material, and attached to a surface. The microbial cells often grow in systems consisting of layers of microbial cells associated with surfaces (hftp://wvlc.uwaterloo.ca/biology447/modules/intro/microbiologyglossary.htm).

In an embodiment of the invention, the mercury reducing bacteria will predominantly be from the Pseudomonas species. A further embodiment of the invention allows for the formation of a glycocalyx on the inclined plates by the biofilm, which acts as a filter by trapping smaller particles from the water. A glycocalyx is an extracellular polymeric material produced by some bacteria. The combination of inclined plates with a biologically active biofilm provides the invention with an efficient method for the removal of mercury from dental effluent. Mercury reducing bacteria are optionally grown in batch culture and coated on the precipitation plates. For example, the plates are optionally immersed in a culture such as a *Trypticase* Soy Broth or Nutrient broth culture containing *Pseudomonas* mercury reducing bacteria. Plates are kept in the culture at a suitable time, temperature and pH to allow a biofilm to form, such as for 48 hours, at pH 7 and 25 degrees Celsius. This method provides a substantially continuous mercury reducing bacteria biofilm on the plates. Optionally >75%, >80%, >85%, >90%, >95%, >98% or >99% of the bacteria in the biofilm are *Pseudomonas* species. Bacteria are optionally immobilized on the biofilm using known techniques.

Biofilm grow optimally at a neutral pH, however they can also withstand harsh conditions due to the formation of multilayer colonies of different or the same bacteria, covered with a glycocalyx. Glycocalyx provides protection for bacteria against pH changes, metals and toxic organic compounds such as may be found within the environment of the separator.

It is contemplated that as amalgam sits in the bottom of the separator unit, there will be a possibility for a small portion of the mercury to dissolve back into solution over time, through the action of anaerobic conditions that could be created at the bottom of the separator, or through the action of disinfectants and cleaners used within the dental office and contained within the dental effluent. The biofilm present on the plates serves an additional advantage by controlling any such emissions of mercury into the effluent within the separator.

The resin filtration chamber optionally includes layers of adsorbents consisting of sand particles, for example, of diameter 2.5 to 5.0 mm, as well as sulfur impregnated charcoal, for example, of diameter 2.5 to 5.0 mm. Between these two adsorbent layers one may include a resin layer, for example, consisting of a strong acid cation exchanger with a sulfonic acid active group, active in a pH range 0–14, bead size 100–300 μm, with one embodiment of the invention having a capacity 1.9 meq/mL. The resin may alternatively comprise biological resin. The resin filter system can be present in a sandwich configuration of adsorption: cation exchanger: adsorption, in ratios, for example, of 1:1:1; 1:2:1; 1:3:1; 1:4:1 or 1:5:1. The sand also acts as an ion-exchange system; however it will also physically impede any larger organic or inorganic particles. In other embodiments, the sand is mixed in with the resin.

Construction Material for the Separator

The separator is optionally constructed from plexiglass, acrylic, stainless steel, plastic or a malleable or solid housing made of the aforementioned materials. The separator is optionally molded with closure clasps that do not fail under the variable pressure, temperature biological and chemical conditions. It is apparent that other materials are useful for the construction of the various components of the separator as required.

Chemical Biscuit for Regulating the pH in the Chemical Conversion Chamber of the Separator.

The pH adjustment chamber is alkaline due to the addition of alkali, such as a carbonate buffer solution or tablet. The invention includes a chemical biscuit designed specifically for use in the chemical modification chamber of the separator that induces the further precipitation of any residual charged or methylated forms of mercury as well as the destruction of any pathogens in the effluent. In addition, the lowered pH helps to control the problem of biofouling in the downstream resin chambers. One of the problems with the current resin based systems is biofouling which creates a need for increased servicing or the use of biocides which can liberate the trapped mercury which then flows into the sewer system. The high pH environment created in the separator of the invention by the biscuit or liquid additive reduces biofouling because it controls biofilm growth on the resin and reduces the presence of unwanted microorganisms without releasing mercury from the resin. The low pH will slow the process of biofouling and increase the lifetime of the resin and time period between servicing. Alternatively, one can use a biological resin to eliminate biofouling. The biscuit formulation is designed to leach out pH altering materials in response to the acidity levels in the chemical modification chamber. As noted above, an alkaline solution may be used instead of a biscuit. A useful pH range for the chemical modification chamber for the invention is, for example, between 8.5–14 or alternatively between 9–11.

In an embodiment of the invention, the chemical biscuit includes 35–55% inorganic carbonate chemical species, 35–55% inorganic phosphate chemical species, and 1–5% Inorganic hydroxyl/oxide chemical species. In an optional embodiment of the invention the biscuit further includes up to 1% titanium and/or zinc, and/or up to 1% inorganic or organic sulphur species. pH adjusting agents for the invention include sodium or potassium hydroxides, as well as sodium or potassium carbonates and sodium or potassium phosphates. To make a solid biscuit, cement is optionally combined with the carbonates or other chemicals in various ratios such as 1:1, 2:1 or 3:1 according to the desired leaching properties of the biscuit. Increasing the amount of cement in the biscuit formulation will decrease the dissolution rate of the pH adjusting chemicals. As the pH becomes more acidic, the dissolution will increase by a log function as related to the definition of pH=−log [H+]. The biscuits will therefore act as a buffer to maintain the pH level of the chemical modification chamber at a suitable level for the precipitation of mercury.

The invention includes various formulations within the above specifications that are useful to optimize the performance of the separator in response to various conditions found in dental offices or clinics. The biscuits described here as part of the invention are optionally molded to any cylindrical, spherical, or box shape or any other form in order to comply with the technical specifications of the separator and optimize the performance of the separator.

EXAMPLE 1

Analytical Evaluation of the Recovery of Mercury by the Separator

A series of experiments were performed with a model separator unit in order to evaluate the efficiency of the device for the removal of mercury from a simulated dental effluent stream containing mercury amalgam. The separator unit consisted of an inlet, surge tank with central connection channel, and plate chamber. In some experiments, the effluent after having passed through the separator was also passed through a resin.

The analytical determination of mercury in the experiments was generally performed following the standard procedure as set out in ISO 11143. The ISO 11143 procedure for the evaluation of mercury levels is a gravimetric analysis using an analytical balance. An alternative to gravimetric analysis for the measurement of mercury levels is atomic adsorption analysis (AA spectroscopy). Experiments were done using AA analyses.

For each of the experiments the separator unit was filled with clean tap water and was allowed to flow through the separator at a rate of 1 L/min prior to commencing any experiments. A simulated dental effluent consisting of amalgam laden water containing 1.67 g/L of amalgam was then flowed through the separator unit at a rate of 750 ml/min for 30 minutes. Samples were not collected from the outlet of the separator until the void volume of the device had already flowed through the separator. 24 fractions of approximately 0.750 L per sample were then collected in series. Fractions 1–5, 6–15, 16–20 and 21–24 were then individually pooled for analysis. The analytical limit of the gravimetric analysis is 0.0001 g which is the limitation of the analytical balance, while the limit of AA is 0.05 mg/L. Results from each of the experiments are presented in Tables 1 and 2.

TABLE 1

Physical removal of mercury using the separator system. No further purification step with an enhanced resin filter system was performed and mercury levels were evaluated using AA.

| Fractions | Separator Physical Separation Mercury (µg/L) | Percentage Removal |
| --- | --- | --- |
| 1–5 | 0.9 | 99.9999 |
| 6–15 | 42.0 | 99.9972 |
| 16–20 | 15.0 | 99.9990 |
| 21–24 | 3.8 | 99.9997 |

TABLE 2

Physical removal of mercury using the separator system. 750 milliliters of sample was collected over each minute increment (750 ml/minute was the rate at which the separator was tested). Each individual sample was split in half after being processed through the DAS unit. For example there were now 2 samples of the minute one increment consisting of approximately 375 ml each. The minute increments are called fractions in the table and text.

| Fractions | Separator Physical Separation Mercury (µg/L) | Percentage Removal |
| --- | --- | --- |
| 1–5 | 4.2 | 99.9997 |
| 6–10 | 2.5 | 99.9998 |
| 11–24 | 2.6 | 99.9998 |

As shown in Table 2, one half of the samples from fractions one through 5 were combined and sent to the lab for analysis. The other half of these samples were combined and processed through the resin before being sent to the lab for analysis. This same procedure was carried out for the other combined fractions as indicated in the tables.

As shown in Table 1 and Table 2, removal of 100% of mercury from the simulated dental effluent was obtained during laboratory tests following the ISO 11143 standard protocols with gravimetric analysis. Using the more sensitive AA analysis, it was possible to evaluate the performance of the separator at a much higher level. Table 3 provides data showing the removal of 99.9972% to 99.9999% of mercury during similar tests following the ISO standard procedure but using the AA.

Moreover, the improved removal of mercury observed in Table 3 shows the utility of the resin/adsorption based system for removing the final traces of soluble and residual forms of mercury, respectively.

EXAMPLE 2

Evaluation of the Liquid Flow Patterns In the Separator

A working model of the invention was constructed out of plexiglass material with an air/water separator surge tank, plate chamber, collection chamber, with an optional chemical and ion-exchange chamber in order to evaluate the flow characteristics of the separator. The determination of the flow characteristics of the separator allowed design of a separator to prevent the clogging or short-circuiting seen in other dental separators. The movement of a water-soluble dye (methylene blue 0.05%) was used in order to observe the motion of the liquid through the separator at a rate of 5 liters per minute for 30 minutes. The dye exhibited Brownian-like movement through the precipitation chamber containing the inclined plates and sedimentation tank, showing that the design of the device provides the appropriately still conditions (turbulence-free) needed to induce sedimentation relative to the air/water separation chamber. No channeling of the fluid through the reactor was observed such that smaller amalgam particles would be able to bypass the precipitation plates.

EXAMPLE 3

Testing of the Separator at a Dental Facility

A prototype separator consisting of 4 inclined plates at a 45 degree angle was tested at a dental centre, using a dental vacuum pump air stream comparable to those found in most dental offices. The dental vacuum pump serviced 6 dental chairs and was run continuously while approximately 5 amalgam filings were removed. The separator functioned, with no loss of fluids, materials or release of noxious odors during a 4 hour test session. The test conditions included periods of variable flow to the separator, as would be present during the routine use of the separator in a clinical setting.

EXAMPLE 4

Separator Including Plate Chamber, Chemical Addition Chamber and Resin Chamber

A separator similar to the device of FIG. 1 is filled with clean tap water and water is allowed to flow through the separator at a rate of 1 L/min prior to commencing any experiments. The separator contains a biscuit having a following composition as described herein to provide an alkaline environment capable of precipitating mercury. The resin bed contains an ion exchange resin, 50 or 100 grams or a resin as described herein. A simulated dental effluent consisting of amalgam laden water containing 1.67 g/L of amalgam is prepared and then flowed through the separator at the unit the separator is designed to process for 30 minutes. Samples are not collected from the outlet of the separator until after the void volume of the device flows through the separator. 24 fractions of approximately 0.94 L per sample are then collected in series. Fractions 1–5, 6–15, 16–20 and 21–24 are then individually pooled for analysis. We measure the mercury content in each fraction to determine the quantity of physical separation of mercury and the percentage of mercury removal and show increased removal compared to Example 2 AA results.

While the present invention has been described with reference to what are presently considered to be the preferred examples, it is to be understood that the invention is not limited to the disclosed examples. To the contrary, the invention is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety.

We claim:

1. A separator for removing mercury from waste water effluent, comprising:
    a plate chamber comprising a plate chamber base and a plurality of plates received in the chamber and inclined to the horizontal, the plates arranged in a first array and a second array, the first and second arrays defining a gap therebetween and
    a surge chamber for collecting waste water effluent, the surge chamber comprising a surge inlet for receiving effluent to be treated and a surge outlet above the plate chamber and aligned over the gap between the first and second arrays for conveying waste water effluent to the plate chamber base through the gap, wherein the surge outlet comprises an aperture formed in the surge chamber for conveying waste water effluent to the plate chamber for distributing uniformly the flow of waste water effluent over the plates in parallel.

2. The separator of claim 1, wherein the aperture in the surge outlet comprises an elongate aperture for conveying waste water effluent to the plate chamber along substantially the entire length of the gap.

3. The separator of claim 1, wherein each of the plurality of the plates comprise substantially the same length, width, surface area and angle of inclination.

4. The separator of claim 3, wherein the plates are inclined between 45–60 degrees to the horizontal.

5. The separator of claim 1, wherein each plate comprises an upper surface and backing surface opposed to the upper surface, and wherein each upper surface and the backing surface of an adjacent plate define a channel therebetween.

6. The separator of claim 1, wherein the plates are configured for sedimenting mercury and the plates further comprise a biofilm of mercuric reducing bacteria for enzymatically precipitating mercury, the bacteria producing glycocalyx for filtering mercury.

7. The separator of claim 1, further comprising:
    a) a chemical addition chamber downstream of the plate chamber, the chemical addition chamber comprising chemical addition means for adding a chemical to the waste water effluent to precipitate mercury, and.
    b) a resin bed chamber downstream of the plate chamber and/or the chemical addition chamber, the resin bed chamber arranged so that waste water effluent flows through the resin bed, the resin bed comprising resin for ionically binding the mercury and filtering the mercury.

8. The separator of claim 7, wherein the resin bed chamber comprises a resin and an adsorption substance for adsorbing mercury.

9. The separator of claim 1, wherein the waste water effluent is a dental vacuum effluent stream comprising waste water and air, and wherein the surge chamber collects the stream and the surge outlet above the plate chamber and aligned over the gap between the plates conveys at least the waste water portion of the stream to the plate chamber through the gap.

10. The separator of claim 9, wherein the surge chamber further comprises an air bypass outlet for separation of air from the waste water effluent by sending air out of the surge chamber through the air bypass outlet.

11. The separator of claim 10, wherein the air sent out of the surge chamber through the air bypass outlet is rejoined downstream with treated water for disposal of the air and treated water.

12. The separator of claim 7, wherein the resin bed chamber is connected to a negative pressure outlet to pull the waste water effluent through the resin bed chamber.

13. A separator for removing mercury from waste water effluent, comprising:
- a plate chamber comprising plate chamber base and a plurality of plates received in the chamber and inclined to the horizontal, and
- a surge chamber for collecting waste water effluent, the surge chamber disposed above the plate chamber and comprising a surge inlet for receiving waste water effluent to be treated and a surge outlet aligned with a connection channel proximate to the plates for conveying waste water effluent to the plate chamber base through the connection channel and for distributing uniformly the flow of the waste water effluent upwardly across the plates in parallel.

14. The separator of claim 13, wherein, each of the plurality of the plates comprise substantially the same length, width, surface area and angle of inclination.

15. The separator of claim 14, wherein the plates are inclined between 45–60 degrees to the horizontal.

16. The separator of claim 15, wherein each plate comprises an upper surface and backing surface opposed to the upper surface, and wherein each upper surface and the backing surface of an adjacent plate define a channel therebetween.

17. A separator for removing mercury from waste water effluent, comprising:
- a plate chamber comprising a plurality of plates received in the chamber and inclined to the horizontal,
- distribution means for distributing uniformly the flow of the waste water effluent over the plates in parallel,
- a chemical addition chamber downstream of the plate chamber, the chemical addition chamber comprising chemical addition means for adding a chemical to the waste water effluent to precipitate mercury, and
- a resin bed chamber downstream of the plate chamber or the chemical addition chamber, or both, the resin bed chamber arranged so that waste water effluent flows though the resin bed, the resin bed comprising resin for ionically binding the mercury and filtering the mercury.

18. The separator of claim 17, wherein the resin bed chamber comprises a resin and an adsorption substance for adsorbing mercury.

* * * * *